United States Patent
Miyatani

(10) Patent No.: US 10,277,796 B2
(45) Date of Patent: Apr. 30, 2019

(54) IMAGING CONTROL APPARATUS, IMAGING APPARATUS, AND IMAGING CONTROL METHOD

(71) Applicant: SONY CORPORATION, Tokyo (JP)

(72) Inventor: Yoshitaka Miyatani, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/311,560

(22) PCT Filed: Mar. 10, 2015

(86) PCT No.: PCT/JP2015/001300
§ 371 (c)(1),
(2) Date: Nov. 16, 2016

(87) PCT Pub. No.: WO2015/182021
PCT Pub. Date: Mar. 12, 2015

(65) Prior Publication Data
US 2017/0085779 A1    Mar. 23, 2017

(30) Foreign Application Priority Data

May 26, 2014  (JP) ................................. 2014-108198

(51) Int. Cl.
*G02B 7/36*  (2006.01)
*G06T 5/00*  (2006.01)
(Continued)

(52) U.S. Cl.
CPC ........... *H04N 5/23212* (2013.01); *G02B 7/36* (2013.01); *G03B 13/36* (2013.01); *G03B 17/18* (2013.01);
(Continued)

(58) Field of Classification Search
CPC ............. H04N 5/23212; H04N 5/2351; H04N 5/23293; H04N 5/23216; G02B 7/36; G06T 5/006; G03B 13/36; G03B 17/18
See application file for complete search history.

(56) References Cited

U.S. PATENT DOCUMENTS

2011/0001858 A1*  1/2011  Shintani .............. H04N 5/2253
                                                        348/294
2011/0249150 A1*  10/2011 Shintani ............. H04N 5/23212
                                                        348/240.3
(Continued)

FOREIGN PATENT DOCUMENTS

JP    2005-295418 A    10/2005
JP    2008-118387 A    5/2008
(Continued)

*Primary Examiner* — Gevell V Selby
(74) *Attorney, Agent, or Firm* — Chip Law Group

(57) ABSTRACT

An imaging control apparatus for achieving proper image control such as focusing control is provided. The imaging control apparatus includes a detection control unit, an image correction unit, and a display control unit. The detection control unit controls detection on the basis of a detection area corresponding to a predetermined area in an object image acquired by an image sensor. The image correction unit corrects, on the basis of lens information relating to an image-pickup lens, the object image displayed on a screen. The display control unit displays, on the basis of the detection area and the lens information, a detection area display at a predetermined position on the screen, the detection area display representing the detection area.

13 Claims, 8 Drawing Sheets

(51) Int. Cl.
  *G03B 13/36* (2006.01)
  *G03B 17/18* (2006.01)
  *H04N 5/232* (2006.01)
  *H04N 5/235* (2006.01)
(52) U.S. Cl.
  CPC ........... *G06T 5/006* (2013.01); *H04N 5/2351* (2013.01); *H04N 5/23216* (2013.01); *H04N 5/23293* (2013.01)

(56) References Cited

U.S. PATENT DOCUMENTS

| | | | | |
|---|---|---|---|---|
| 2012/0044408 A1* | 2/2012 | Sasaki | ............... | H04N 5/23212 348/345 |
| 2014/0204266 A1* | 7/2014 | Ito | ............... | H04N 5/23212 348/349 |
| 2015/0125078 A1* | 5/2015 | Kitagawa | ............... | G06T 5/50 382/173 |
| 2015/0189167 A1* | 7/2015 | Gwak | ............... | H04N 5/23222 348/222.1 |
| 2015/0304529 A1* | 10/2015 | Kawai | ............... | H04N 5/232 348/240.3 |
| 2015/0365661 A1* | 12/2015 | Hayashi | ............... | H04N 5/23209 348/175 |

FOREIGN PATENT DOCUMENTS

| | | |
|---|---|---|
| JP | 2008-292715 A | 12/2008 |
| JP | 2009-109548 A | 5/2009 |
| JP | 2009-284462 A | 12/2009 |
| JP | 2009-302657 A | 12/2009 |
| WO | 2007-129444 A1 | 11/2007 |
| WO | 2007/129444 A1 | 11/2007 |

* cited by examiner

IMAGING CONTROL APPARATUS, IMAGING APPARATUS, AND IMAGING CONTROL METHOD

CROSS REFERENCE TO RELATED APPLICATIONS

This application is a U.S. National Phase of International Patent Application No. PCT/JP2015/001300 filed on Mar. 10, 2015, which claims priority benefit of Japanese Patent Application No. JP 2014-108198 filed in the Japan Patent Office on May 26, 2014. Each of the above-referenced applications is hereby incorporated herein by reference in its entirety.

TECHNICAL FIELD

The present technology relates to an imaging control apparatus, an imaging apparatus, and an imaging control method that perform an autofocus function and display control thereof.

BACKGROUND ART

In recent years, an electronic apparatus such as a digital camera typically includes a monitor that displays a picked-up image for performing focusing or determining composition at the time of image-pickup. In addition, in these days, a range-finding frame is displayed on the monitor, and the color of the focused range-finding frame is changed or only the focused range-finding frame is displayed so that a user can more easily bring an object into focus.

In Patent Document 1, for example, an imaging apparatus that is capable of displaying, for the user, a more-focused point of the picked-up image by preferentially magnifying and displaying, on an LCD, an image having a proximate focused area when the focused frame of the picked-up image is picked up is described.

Patent Document 1: Japanese Patent Application Laid-open No. 2005-295418

SUMMARY

Problem to be Solved

For example, if an image-pickup lens has distortion, displacement may be generated in a positional relationship between an object image displayed on the monitor and the range-finding frame. As a result, it may be difficult to perform proper focus control of the object in a predetermined area intended by the user.

In view of the circumstances as described above, it is an object of the present technology to provide an imaging control apparatus, an imaging apparatus, and an imaging control method that are capable of achieving proper image control such as focusing control.

Means for Solving the Problem

An imaging control apparatus according to an embodiment of the present technology includes a detection control unit, an image correction unit, and a display control unit.

The detection control unit controls detection on the basis of a detection area corresponding to a predetermined area in an object image acquired by an image sensor.

The image correction unit corrects, on the basis of lens information relating to an image-pickup lens, the object image displayed on a screen.

The display control unit displays, on the basis of the detection area and the lens information, a detection area display at a predetermined position on the screen, the detection area display representing the detection area.

The imaging control apparatus includes a display control unit that displays, on the basis of a detection area and lens information, a detection area display at a predetermined position on a screen, the detection area display representing a detection area. Accordingly, it is possible to display the object image on the screen so that the detection area display corresponds to the object image. Therefore, it is possible to achieve focusing control intended by the user, for example.

The detection area display typically includes a range-finding frame that represents an auto focus (AF) area, a display frame that represents an auto exposure (AE) area, and the like.

The display control unit may determine, on the basis of the lens information, necessity of correcting a display position of the detection area display.

The display position is corrected only when correction is necessary, thereby making it possible to make the display processing more efficient.

The display control unit may display the detection display area on the screen when an area in the object image corresponding to the detection area is focused.

Accordingly, it is possible to display the in-focus position for the user.

The detection area may include a plurality of detection areas. The detection control unit may control detection on the basis of a detection area selected from the plurality of detection areas.

Accordingly, it is possible to achieve focusing control of the object in the detection area intended by the user, for example.

In this case, the detection control unit may be configured to determine, on the basis of the lens information, necessity of correcting the selected detection area.

Accordingly, it is possible to prevent displacement of the position of the detection area caused due to distortion.

The lens information typically includes distortion information of the image-pickup lens. The image correction unit is configured to correct, on the basis of the distortion information, distortion of the object image.

The lens information may be acquired from the image-pickup lens.

The detection control unit typically detects an in-focus position of an area in the object image corresponding to the detection area. However, it is not limited thereto, and the detection control unit may detect an amount of exposure of an area in the object image corresponding to the detection area.

The imaging control apparatus may further include an acquisition unit that acquires the lens information.

The imaging control apparatus may further include a detection unit that is controlled by the detection control unit. The detection unit performs detection processing on the basis of the detection area.

An imaging apparatus according to an embodiment of the present technology includes an image-pickup optical system, an image sensor, a detection control unit, an image correction unit, a display unit, and a display control unit.

The image-pickup optical system includes an image-pickup lens.

The image sensor acquires an object image formed by the image-pickup optical system.

The detection control unit controls detection on the basis of a detection area corresponding to a predetermined area in the object image acquired by the image sensor.

The image correction unit corrects, on the basis of lens information relating to the image-pickup lens, the object image acquired by the image sensor.

The display unit includes a screen displaying the object image corrected by the image correction unit and a detection area display that represents the detection area.

The display control unit displays, on the basis of the detection area and the lens information, the detection area display at a predetermined position on the screen.

The image sensor may include a plurality of phase difference detection pixels that perform pupil-division of the image-pickup lens. Accordingly, it is possible to achieve autofocus control at a high speed. Further, it is possible to reduce the calculation burden necessary for the detection and to shorten the time necessary for the detection processing, as compared with the case where detection control is performed on the basis of the corrected object image.

The detection area may include a plurality of detection areas. The display unit may further include a touch sensor that detects a selection operation for one of a plurality of detection area displays that represent the plurality of detection areas.

An imaging control method according to an embodiment of the present technology includes controlling detection on the basis of a detection area corresponding to a predetermined area in an object image acquired by an image sensor.

On the basis of lens information relating to an image-pickup lens, the object image displayed on a screen is corrected.

On the basis of the detection area and the lens information, a detection area display is displayed at a predetermined position on the screen, the detection area display representing the detection area.

Effects

As described above, according to the present technology, it is possible to achieve proper image control such as focusing control.

Note that effects described herein are not necessarily limited, and may be any of the effects described herein.

BRIEF DESCRIPTION OF DRAWINGS

FIG. 2 A schematic diagram showing an example of arrangement of normal pixels and phase difference detection pixels in an image sensor.

DESCRIPTION OF PREFERRED EMBODIMENTS

Hereinafter, embodiments of the present technology will be described with reference to the drawings.

[Imaging Apparatus and Imaging Control Apparatus]

Figure 1:
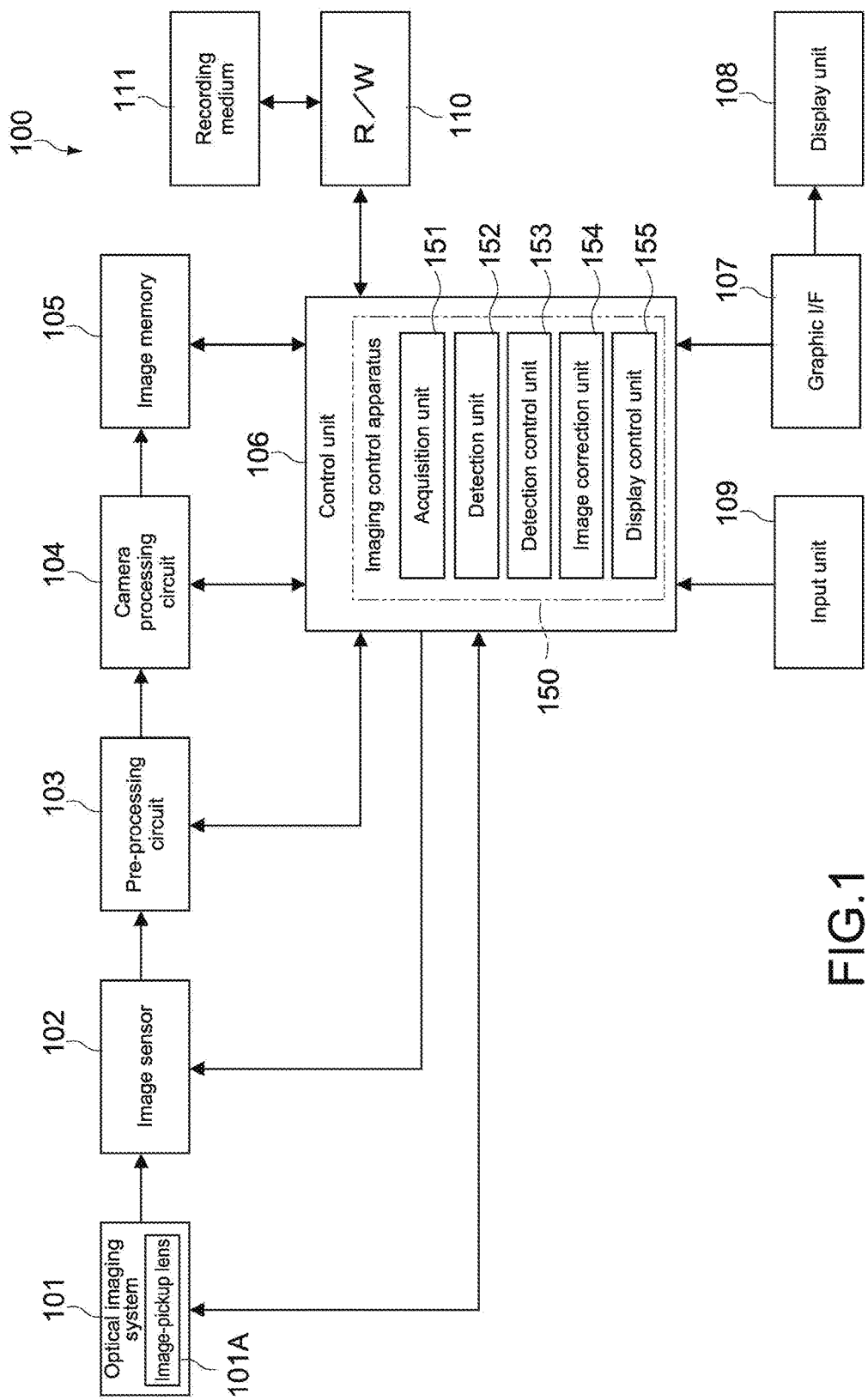
FIG. 1 A block diagram showing a whole configuration of an imaging apparatus according to this embodiment.

FIG. 1 is a block diagram showing a whole configuration of an imaging apparatus 100 according to this embodiment.

The imaging apparatus 100 includes an optical imaging system 101, an image sensor 102, a pre-processing circuit 103, a camera processing circuit 104, an image memory 105, a control unit 106, a graphic I/F (interface) 107, a display unit 108, an input unit 109, and an R/W (reader/writer) 110. The control unit 106 functions as an imaging control apparatus 150.

The optical imaging system 101 includes an image-pickup lens 101A for collecting light from an object in the image sensor 102, a drive mechanism for performing focusing or zooming by moving the image-pickup lens 101A, a shutter mechanism, an iris mechanism, and the like. They are driven in response to a control signal from the control unit 106. A light image of the object acquired via the optical imaging system 101 is formed on the image sensor 102 serving as an imaging device.

The image sensor 102 includes an R (Red) pixel, a G (Green) pixel, and a B (Blue) pixel, which are normal pixels, and a phase difference detection pixel for phase difference detection. The pixels constituting the image sensor 102 each photoelectrically convert incident light from the object into the amount of charge and output a pixel signal. Then, the image sensor 102 eventually outputs an imaging signal including a pixel signal to the pre-processing circuit 103. As the image sensor 102, a CCD (Charge Coupled Device), CMOS (Complementary Metal Oxide Semiconductor), or the like is used.

Figure 2:
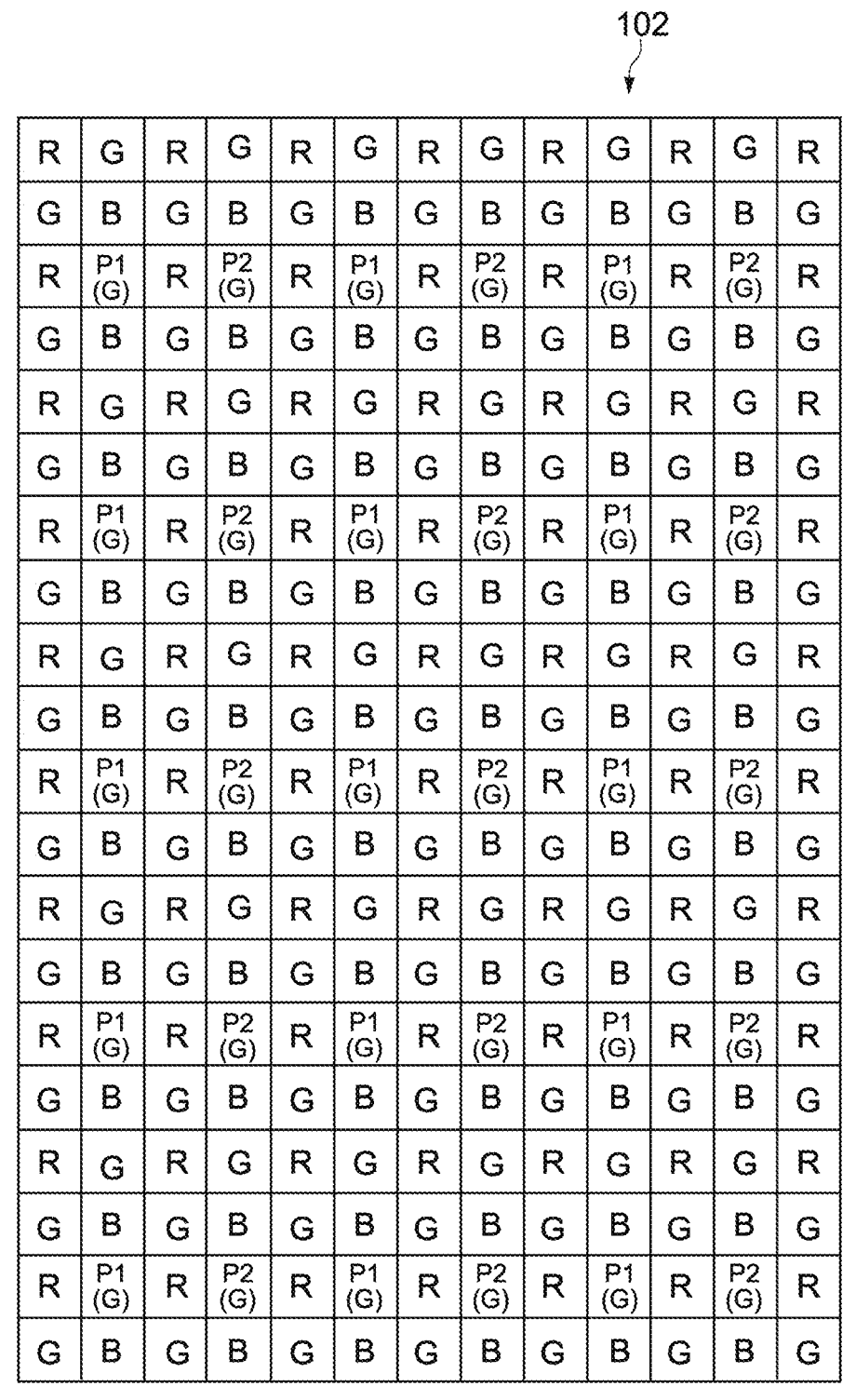

FIG. 2 is a schematic diagram showing an example of arrangement of normal pixels and phase difference detection pixels in the image sensor 102. In FIG. 2, an R, G, and B are the R (Red) pixel, G (Green) pixel, and B (Blue) pixel, respectively, and represent normal imaging pixels. Further, in FIG. 2, a P1 and P2 respectively represent a first phase difference detection pixel and a second phase difference detection pixel.

The phase difference detection pixels are configured to make pairs of P1 and P2, and perform pupil-division of the image-pickup lens 101A. The phase difference detection pixel P1 and P2 have optical properties different from those of the normal imaging pixels. Note that in FIG. 2, a part of G pixels is used as the phase difference detection pixel. This is because the number of G pixels is twice the number of R pixels or B pixels. It should be noted that the phase difference detection pixel is not limited to the G pixel.

The image sensor 102 includes a plurality of phase difference detection pixels P1 and P2 for performing pupil-division of the image-pickup lens 101A as well as the normal pixels R, G, and B. The imaging apparatus 100 is configured to perform so-called image surface phase difference AF (Auto Focus) with output from the plurality of phase difference detection pixels P1 and P2.

The pre-processing circuit 103 performs, for example, a sample hold operation on the imaging signal output from the image sensor 102 so as to maintain the S/N (Signal/Noise) ratio at a favorable value with CDS (Correlated Double Sampling) processing. Further, the pre-processing circuit 103 controls gain with AGC (Auto Gain Control) processing, and outputs a digital image signal by performing A/D (Analog/Digital) conversion.

The camera processing circuit 104 performs, on the image signal from the pre-processing circuit 103, signal processing such as white balance adjustment processing, color correction processing, gamma correction processing, Y/C conversion processing, and AE (Auto Exposure) processing.

The image memory 105 is a volatile memory, e.g., buffer memory including a DRAM (Dynamic Random Access Memory), and temporarily stores image data on which the pre-processing circuit 103 and the camera processing circuit 104 have performed predetermined processing.

The control unit 106 includes, for example, a CPU, a RAM and a ROM. In the ROM, for example, a program that is read by the CPU and operated is stored. The RAM is used as a work memory of the CPU. The CPU controls the entire imaging apparatus 100 by performing various kinds of processing in accordance with the program stored in the ROM.

The control unit 106 functions as the imaging control apparatus 150 by executing a predetermined program. It should be noted that the imaging control apparatus 150 does not necessarily need to be realized by a program, and may be realized by a dedicate apparatus as hardware having a function as the imaging control apparatus. In this case, the imaging apparatus 100 includes the imaging control apparatus as the hardware.

The imaging control apparatus 150 includes an acquisition unit 151, a detection unit 152, a detection control unit 153, an image correction unit 154, and a display control unit 155.

Note that the acquisition unit 151 and the detection unit 152 do not necessarily need to be configured by a part of the imaging control apparatus 150, and may be configured independently of the imaging control apparatus.

The acquisition unit 151 is configured to acquire a control parameter necessary for focus adjustment performed by the detection unit 152 or a correction value necessary for, for example, correction of distortion of an object image performed by the image correction unit 154.

The acquisition unit 151 acquires lens information and a phase difference signal. The lens information includes lens information relating to the image-pickup lens 101A, i.e., zooming (focal length), focusing (image-pickup distance), and aperture (F-number) in the image-pickup lens 101A and distortion information such as the amount of distortion. The acquisition unit 151 acquires the lens information from, for example, a microcomputer (not shown) that manages the image-pickup lens 101A, and acquires the phase difference signal from the image sensor 102 including the phase difference detection pixels P1 and P2.

The lens information, the phase difference signal, and the like acquired by the acquisition unit 151 may be stored in the ROM of the control unit 106 that functions as the imaging control apparatus 150 or in a separate storage medium.

The detection unit 152 is configured to detect, on the basis of the lens information, the phase difference signal, and the like acquired by the acquisition unit 151, a detection area corresponding to a predetermined area in the object image acquired by the image sensor 102.

The detection control unit 153 controls the detection on the basis of the detection area. Specifically, the detection control unit 153 controls the detection processing of the detection area performed by the detection unit 152. Typically, a plurality of detection areas are set to correspond to the predetermined areas of the object image. The detection areas are displayed on a screen of the display unit 108 as detection area displays in a predetermined form.

The detection area display is typically displayed at a plurality of positions on the screen of the display unit 108. The detection areas each include a plurality of phase difference detection pixels, and the detection area display is displayed on the screen as a range-finding frame for AF and a display frame for AE. The plurality of detection area displays may be displayed on the screen in a grid pattern, or may be separately displayed at arbitrary positions.

The detection unit 152 performs detection processing on the predetermined detection area that is set in advance or selected by a user. The detection control unit 153 causes the detection unit 152 to detect the in-focus position of the area in the object image corresponding to the detection area. Specifically, the detection unit 152 calculates, on the basis of the phase difference signal in the detection area, a difference between a focal position acquired by the image sensor 102 and a position of the best image surface in the image-pickup lens 101A, and determines the amount of movement of the image-pickup lens 101A to the optical axis direction. The detection unit 152 outputs an AF control signal for driving the image-pickup lens 101A to the optical imaging system 101, and performs focusing control of the object image.

In this embodiment, since the detection unit 152 is configured to perform autofocus control of an image by using the phase difference signal from the phase difference detection pixel, it is possible to achieve autofocus control at a high speed. Further, the detection unit 152 is configured to perform autofocus control on an image on which distortion correction has not been performed by the image correction unit 154. Accordingly, it is possible to reduce the calculation burden necessary for the detection and to shorten the time necessary for the detection processing, as compared with the case where detection control is performed on the basis of the corrected object image.

The image correction unit 154 is configured to correct, on the basis of the lens information (distortion information) acquired by the acquisition unit 151, the distortion of the object image displayed on the screen of the display unit 108.

Figure 3:
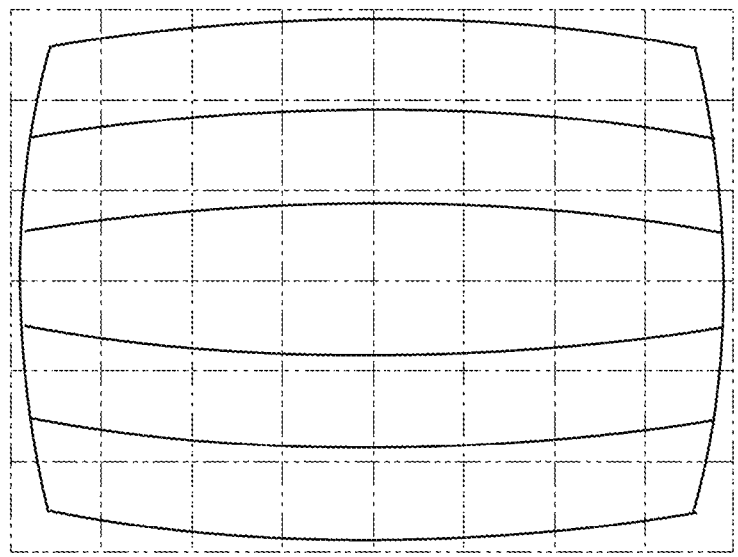
FIG. 3 A schematic diagram explaining distortion of an image.
Figure 3:
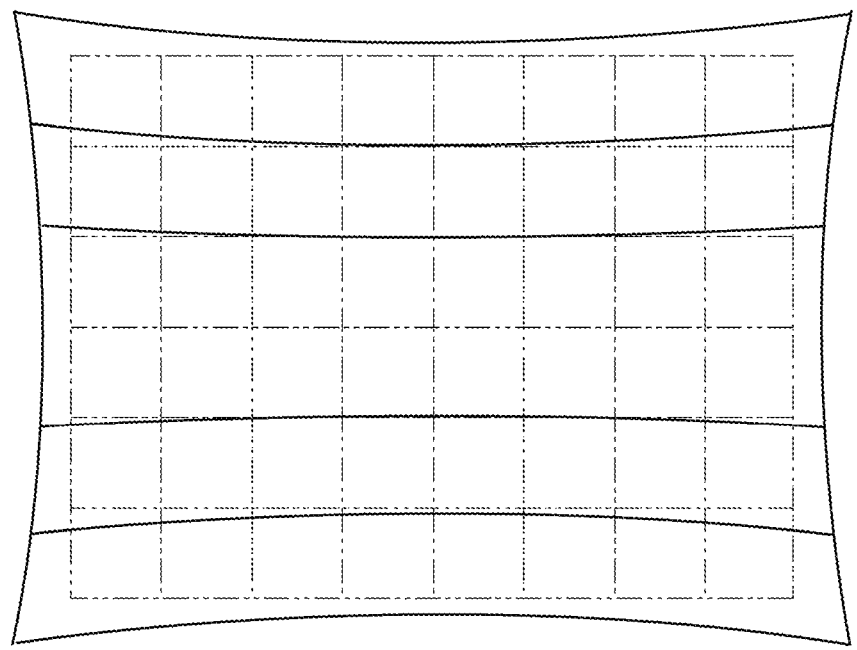

When the image-pickup lens 101A has aberration, optical distortion is generated on the object image formed via the image-pickup lens 101A. Because the image sensor 102 converts the object image formed by the optical imaging system 101 into an image signal as it is, also the image signal is affected by the optical distortion of the object image. Typical optical distortion includes distortion such as "barrel distortion" shown in part A of FIG. 3 and "pincushion distortion" shown in part B of FIG. 3. Part A and Part B of FIG. 3 show the state where an image of the object in the range shown by an alternate long and two short dashes line is formed in a shape shown by a solid line due to distortion.

The image correction unit 154 is configured to correct, on the basis of the lens information relating to the image-pickup lens, the object image displayed on the screen. Specifically, the image correction unit 154 determines the amount of distortion of the image-pickup lens 101A from the acquired lens information, and corrects the object image acquired by the image sensor 102 to obtain an image with no aberration. The control unit 106 generates an image signal for displaying the object image corrected by the image correction unit 154 on the screen of the display unit 108.

Figure 4:
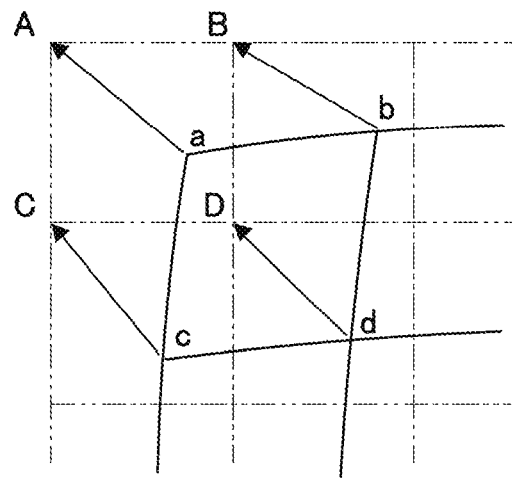
FIG. 4 A schematic diagram explaining a method of correcting the distortion.

The distortion of the object image can be corrected by converting the object image into digital data and rearranging pixel data depending on the amount of distortion, for example. In the case where an image on which barrel distortion is generated is corrected, for example, pixels at a to d points are respectively read as pixels at A to D points, as shown in FIG. 4. Accordingly, it is possible to generate an image whose distortion has been corrected. At this time, it is also possible to adjust the number of pixels with interpolation processing, thinning out processing, and the like.

Note that the control unit 106 may be configured to generate, by user's selection, a control signal for displaying the object image acquired by the image sensor 102 on the screen of the display unit 108 as it is without performing the above mentioned aberration correction on the object image.

Figure 5:
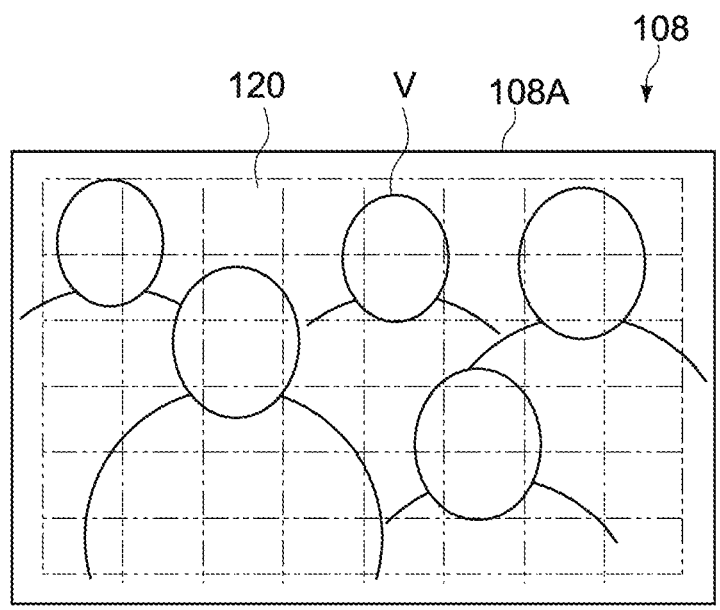
FIG. 5 A schematic diagram showing a display example of a detection area on a screen.

The display control unit 155 displays, at a predetermined position on the screen, the detection area display that represents the detection area, on the basis of the detection area and the lens information. Specifically, the display control unit 155 displays an AF frame (detection frame) as the detection area display on the screen of the display unit 108. FIG. 5 shows a display example of the AF frame. On a screen 108A of the display unit 108, an object image V on which distortion correction has been performed by the image correction unit 154 is displayed. An AF frame 120 is superimposed on the object image and is displayed. All AF frames 120 may be displayed, or only focused AF frame may be displayed. In the former case, the focused AF frame may be displayed in a form different from that of a non-focused AF frame.

In the shown example, as the AF frame 120, 7 AF frames and 8 AF frames are arranged vertically and horizontally, respectively, in a grid pattern. However, the number and position of AF frames are not limited to the above-mentioned example. Further, the AF frames 120 do not necessarily need to be displayed adjacent to each other, and may be displayed separately from each other.

The detection unit 152 performs autofocus control of the object image regarding a predetermined AF frame 120. The predetermined AF frame 120 may be all AF frames 120 or one or more AF frames specified by the user.

Typically, the detection unit 152 performs range-finding control of the AF frame on the basis of the object image before distortion correction. Therefore, the detection area is set on the basis of the object image before distortion correction. On the other hand, since the object image on which distortion correction has been performed is displayed on the screen 108A, displacement is generated in a relative position between the object image V and the AF frame 120 on the screen 108A when the AF frame set on the basis of the object image before distortion correction is displayed on the screen 108A as it is. In this case, it may be difficult to achieve proper AF control intended by the user.

In view of the above, in this embodiment, the display control unit 155 is configured to correct, on the basis of the lens information acquired by the acquisition unit 151, the display position of the detection area displayed on the screen of the display unit 108. Accordingly, it is possible to display the AF frame 120 so that the AF frame 120 corresponds to the object image V on the screen 108A. Therefore, it is possible to achieve focusing control intended by the user.

The display control unit 155 determines, on the basis of the lens information of the image-pickup lens 101A, necessity of correcting the display position of the AF frame 120 (detection area display) on the screen 108A. Specifically, the display control unit 155 is configured to determine whether or not the display position of the AF frame 120 needs to be corrected, depending on the amount of distortion of the image-pickup lens 101A, and correct the display position only when correction is necessary, thereby making it possible to make the display processing more efficient. The amount of distortion is determined on the basis of the lens information of the image-pickup lens 101A. Alternatively, the amount of distortion may be determined on the basis of the amount of correction performed by the image correction unit 154.

The graphic I/F 107 generates an image signal for displaying an image on the display unit 108 from an image signal supplied from the control unit 106, and supplies this signal to the display unit 108 to display the image.

The display unit 108 includes a screen that displays the object image on which distortion correction is performed by the image correction unit 154, the detection area whose display position is corrected by the display control unit 155, and the like. The display unit 108 includes, for example, an LCD (Liquid Crystal Display), an organic EL (Electro Luminescence) panel, or the like. The display unit 108 may include a touch sensor that is capable of detecting touch input on the screen. On the screen, a through-image currently imaged, an image recorded in a storage medium 111, and the like are displayed.

The input unit 109 includes, for example, a power source button for switching on/off of the power source, a release button for supporting start of recording an image, an operation element for zoom adjustment, a touch screen (touch panel) integrated with the display unit 108, and the like. When input to the input unit 109 is made, a control signal depending on the input is generated and output to the control unit 106. Then, the control unit 106 performs arithmetic processing or control corresponding to the control signal.

The R/W 110 is an interface to which the storage medium 111 that stores image data generated by imaging and the like is connected. The R/W 110 writes data supplied from the control unit 106 in the storage medium 111, and outputs, to the control unit 106, data read from the storage medium 111. The storage medium 111 includes, for example, a hard disk, a card type storage medium, a high-capacity storage medium such as a USB memory, or the like.

[Operation of Imaging Apparatus and Imaging Control Apparatus]

Hereinafter, details of the imaging control apparatus 150 will be described together with the operation of the imaging apparatus 100.

Figure 6:
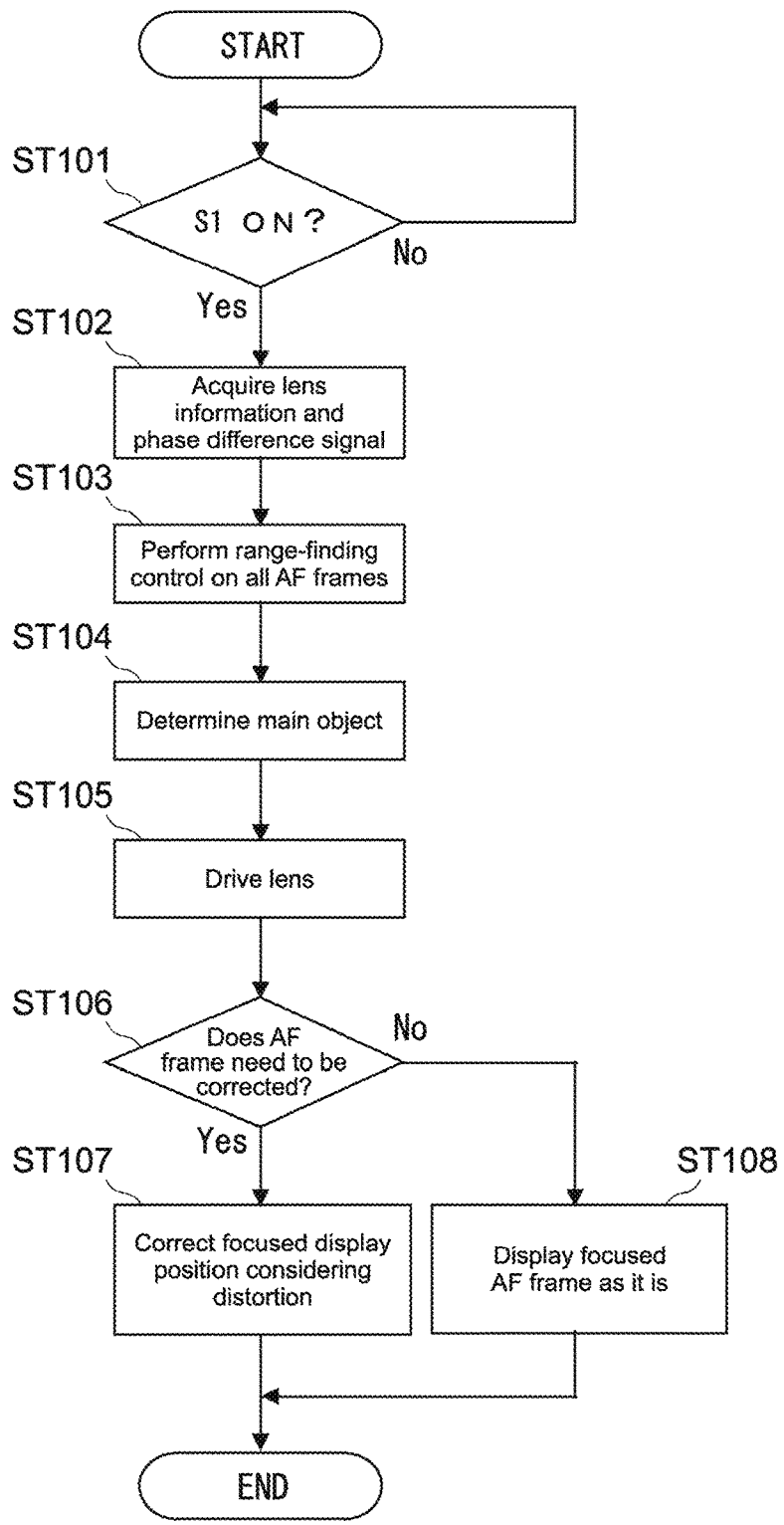
FIG. 6 A flowchart explaining an operation example of the imaging control apparatus.

FIG. 6 is a flowchart explaining an operation example of the imaging control apparatus 150. Description will be made with an example in which the imaging control apparatus 150 automatically performs focusing control of a particular area in the object image.

In the still image pickup mode of the imaging apparatus 100, the object image formed by the optical imaging system 101 is acquired by the image sensor 102, and a framing image thereof is displayed on the screen 108A.

When half-pressing (S1) of a shutter button (release button) by a user is detected, the acquisition unit 151 acquires the lens information of the image-pickup lens 101A and the phase difference signal (Steps 101 and 102). The lens information may be acquired directly from the optical imaging system 101 or read from a memory that stores the lens information acquired in advance. The phase difference signal is acquired from the phase difference detection pixels P1 and P2 of the image sensor 102.

The detection control unit 153 causes the detection unit 152 to perform range-finding control on all AF frames (detections areas) 120, and determines a main object (Steps 103 and 104). As the main object, an object closest to the image-pickup lens 101A or an object located at the center is selected, for example. The detection unit 152 drives the image-pickup lens 101A to perform focusing control of the determined main object (Step 105).

The image correction unit 154 performs distortion correction on the object image on the basis of the lens information acquired by the acquisition unit 151, and causes the screen 108A to display the object image with no distortion. On the other hand, the display control unit 155 determines, on the basis of the lens information, whether or not the display position of the AF frame 120 needs to be corrected (Step 106).

Typically, in the case where the display position is changed by a predetermined amount or more due to distortion correction of the image when the focused AF frame 120 is displayed, the display position of the AF frame 120 is corrected depending on the amount of change. In the case where the amount of change is smaller than the predetermined amount, the AF frame 120 is displayed as it is without correcting the position of the AF frame 120 (Steps 107 and 108).

Figure 7:
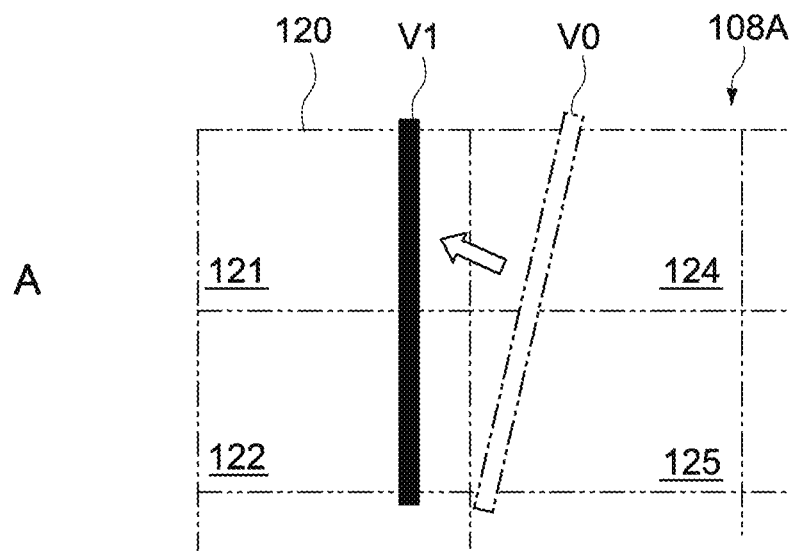
FIG. 7 A schematic diagram explaining an example of display control of the detection area by the imaging control apparatus.
Figure 7:
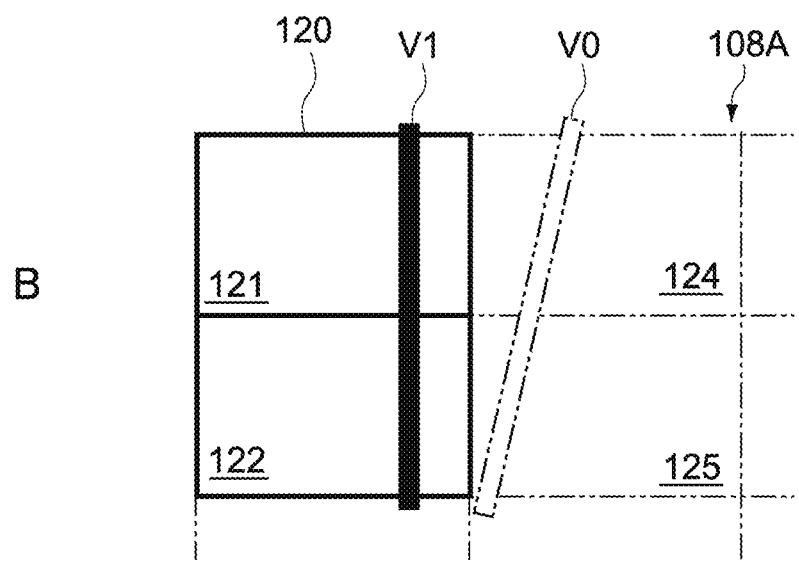

Part A of FIG. 7 shows the state where an image in AF frames 124 and 125 before distortion correction is moved in AF frames 121 and 122 due to distortion correction. The detection unit 152 detects the phase difference signal in the AF frames 124 and 125 for performing focusing control of an image V0 before distortion correction. The image correction unit 154 displays, on the screen 108A, an image V1 on which distortion correction has been performed instead of the image V0. The display control unit 155 lights up and displays, on the screen 108A as shown in part B of FIG. 7, the AF frames 121 and 122 in which the V1 is located after focusing control of the area in the object image corresponding to the AF frames 124 and 125 in which the V0 is located is completed.

As described above, according to this embodiment, it is possible to properly display the in-focus position because displacement of the position of focused display on the screen 108A is prevented. Accordingly, it is possible to achieve proper focusing control intended by the user.

Figure 8:
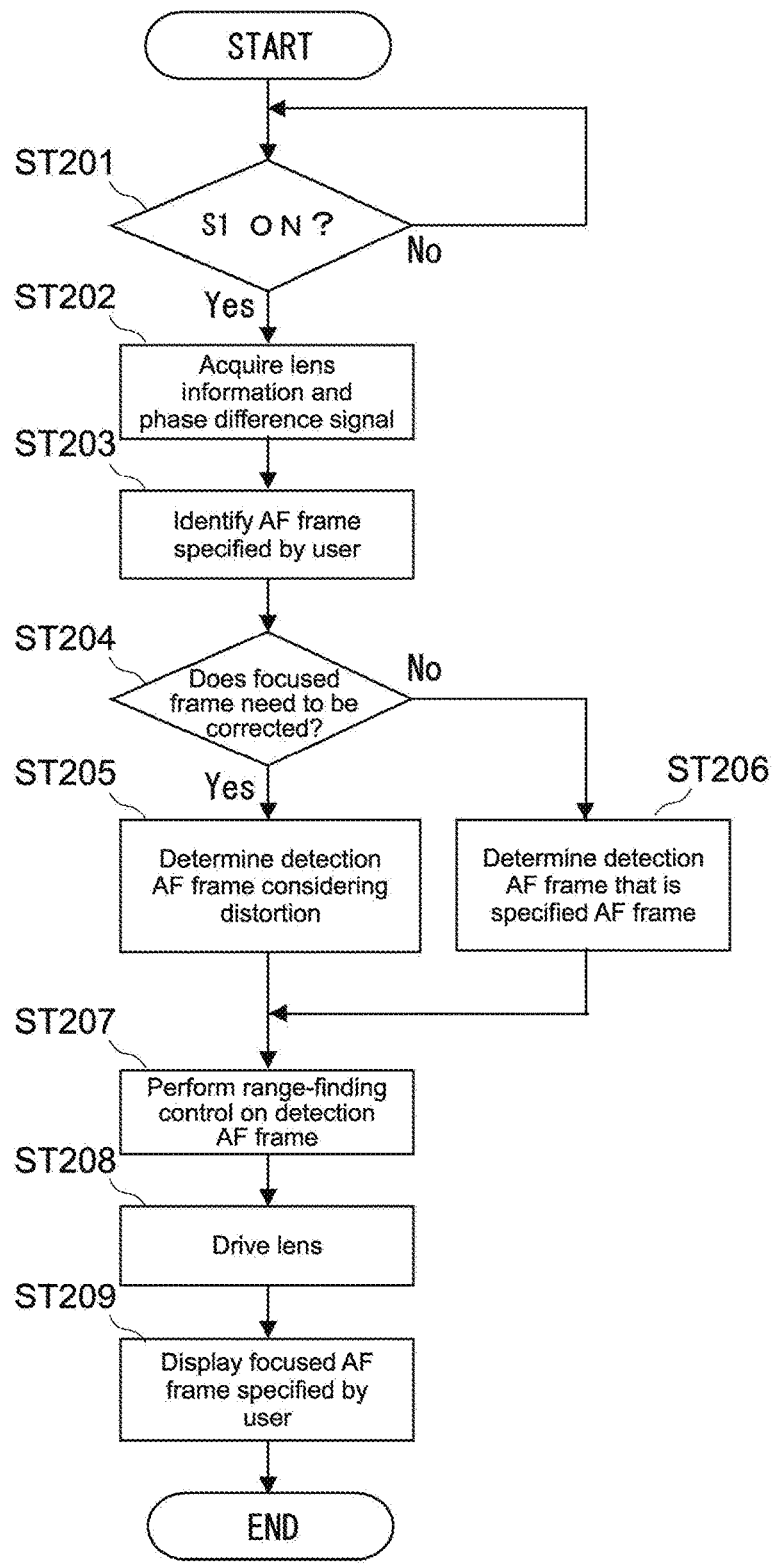
FIG. 8 A flowchart explaining another operation example of the imaging control apparatus.

FIG. 8 is a flowchart explaining another operation example of the imaging control apparatus 150. Description will be made with an example in which focusing control is performed on a particular area in the object image specified by the user.

Similarly to the above-mentioned operation example, when half-pressing (S1) of a shutter button (release button) by a user is detected, the acquisition unit 151 acquires the lens information of the image-pickup lens 101A and the phase difference signal (Steps 201 and 202).

Next, the image correction unit 154 performs distortion correction of the object image on the basis of the lens information acquired by the acquisition unit 151, and causes the screen 108A to display the object image with no distortion. On the other hand, the display control unit 155 receives input of a particular focused frame (detection area) specified by the user.

The above-mentioned focused frame may be one or more areas of the plurality of AF frames 120 displayed on the screen 108A as shown in FIG. 5 or one or more arbitrary areas on the screen 108A. In the latter case, it does not need to display the AF frame 120 itself on the screen 108A, and it only needs to determine the focused frame corresponding to the position specified by the user.

Note that the specification of the above-mentioned focused frame may be touch input to the screen 108A or a selection input operation (e.g., cursor operation) via a predetermined operation button. In the case where the specification of the focused frame is performed by touch input to the screen 108A, the touch sensor detects, from the plurality of focused frames, a focused frame on which a selection operation is performed, and outputs the detection result to the control unit 106. The number of focused frames on which a selection operation is performed is not limited to one, and may be two or more.

The detection control unit 153 identifies the focused frame specified by the user (Step 203) before determining whether or not the specified focused frame needs to be corrected on the basis of the lens information (Step 204).

Typically, in the case where the position is changed by a predetermined amount or more due to distortion correction of the image when the specified focused frame is identified, the detection control unit 153 corrects the position of the focused frame depending on the amount of change. In the case where the amount of change is smaller than the predetermined amount, the detection control unit 153 employs the focused frame at the specified position as it is without correcting the position of the focused frame (Steps 205 and 206).

Next, the detection control unit 153 causes the detection unit 152 to perform range-finding control on the specified focused frame, and drives the image-pickup lens 101A to perform focusing control of the image in the focused frame (Steps 207 and 208). After the focusing control is completed, the focused frame is lit up and displayed on the screen 108A (Step 209). In this case, the display position of the focused frame is determined depending on the determination results of Step 204.

Figure 9:
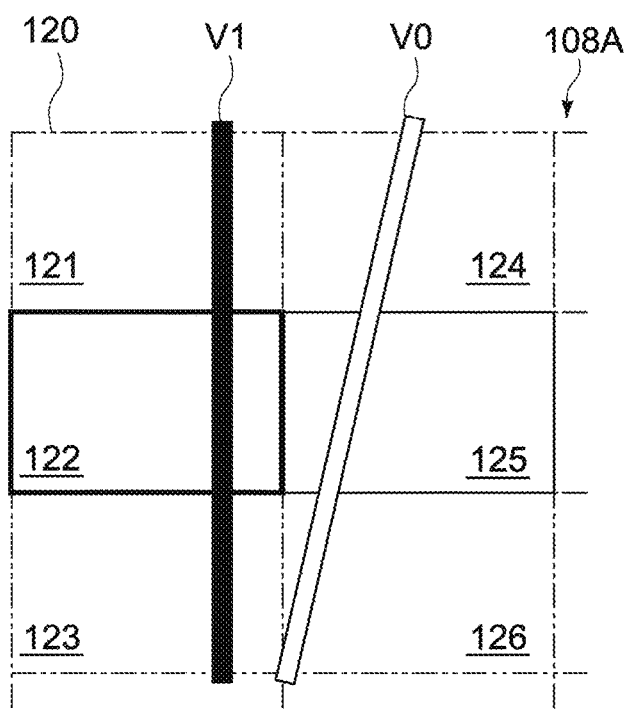
FIG. 9 A schematic diagram explaining an example of display control of the detection area by the imaging control apparatus.

FIG. 9 is a schematic diagram explaining the relationship between the display position of the focused frame and the detection area.

In this operation example, the detection area (focused frame) is selected by user's specification. As described above, the detection control of the object image is performed on the image V0 before distortion correction, and the image V1 after the distortion correction is displayed on the screen 108A. In FIG. 8, in the case where the focused frame 122 on the screen 108A is specified by the user, for example, the detection unit 152 considers that the focused frame 125 in which the image V0 before distortion is located has been specified and performs detection control on the focused frame 125. After the focusing is completed, the focused frame 122 corresponding to the display position of the image V1 after distortion correction is lit up and displayed.

As described above, also in this operation example, it is possible to properly display the in-focus position because displacement of the position of focused display on the screen 108A is prevented. Accordingly, it is possible to achieve proper focusing control intended by the user.

Although embodiments of the present technology have been described, the present technology is not limited to the above-mentioned embodiments and various modifications can be made without departing from the essence of the present technology.

For example, in the embodiments described above, description has been made with an example of the autofocus control (AF control) of the object image. However, alternatively or in addition thereto, the present technology can be applied also to automatic exposure control (AE control). In this case, the detection control unit 153 causes the detection unit 152 to detect at least one of the in-focus position and the amount of exposure of an area in the object image corresponding to the detection area.

In addition, in the embodiments described above, an example in which the phase difference detection pixels P1 and P2 for phase difference detection are incorporated in the image sensor 102 has been described. However, it is also possible to perform AF control of the object image by separately using a dedicated image sensor for phase difference detection. Further, it does not necessarily need to use an image-surface phase difference detection method, and an AF control technology using a so-called contrast method may be employed.

It should be noted that the present technology may take the following configurations.

(1)

An imaging control apparatus, comprising:

a detection control unit that controls detection on the basis of a detection area corresponding to a predetermined area in an object image acquired by an image sensor;

an image correction unit that corrects, on the basis of lens information relating to an image-pickup lens, the object image displayed on a screen; and a display control unit that displays, on the basis of the detection area and the lens information, a detection area display at a predetermined position on the screen, the detection area display representing the detection area.

(2)

The imaging control apparatus according to (1) above, in which the display control unit determines, on the basis of the lens information, necessity of correcting a display position of the detection area display.

(3)

The imaging control apparatus according to (1) or (2) above, in which the display control unit displays the detection area display on the screen when an area in the object image corresponding to the detection area is focused.

(4)

The imaging control apparatus according to any one of (1) to (3), in which the detection area includes a plurality of detection areas, and the detection control unit controls detection on the basis of a detection area selected from the plurality of detection areas.

(5)

The imaging control apparatus according to (4) above, in which the detection control unit determines, on the basis of the lens information, necessity of correcting the selected detection area.

(6)

The imaging control apparatus according to any one of (1) to (5) above, in which the lens information includes distortion information of the image-pickup lens, and the image correction unit corrects, on the basis of the distortion information, distortion of the object image.

(7)

The imaging control apparatus according to any one of (1) to (6) above, in which the lens information is acquired from the image-pickup lens.

(8)

The imaging control apparatus according to any one of (1) to (7) above, in which the detection control unit detects an in-focus position of an area in the object image corresponding to the detection area.

(9)

The imaging control apparatus according to any one of (1) to (8) above, in which the detection control unit detects an amount of exposure of an area in the object image corresponding to the detection area.

(10)

The imaging control apparatus according to any one of (1) to (9) above, further including an acquisition unit that acquires the lens information.

(11)

The imaging control apparatus according to any one of (1) to (10) above, further including a detection unit that is controlled by the detection control unit and performs detection processing on the basis of the detection area.

(12)

An imaging apparatus, including:

an image-pickup optical system including an image-pickup lens;

an image sensor that acquires an object image formed by the image-pickup optical system;

a detection control unit that controls detection on the basis of a detection area corresponding to a predetermined area in the object image acquired by the image sensor;

an image correction unit that corrects, on the basis of lens information relating to the image-pickup lens, the object image acquired by the image sensor;

a display unit that includes a screen displaying the object image corrected by the image correction unit and a detection area display that represents the detection area; and a display control unit that displays, on the basis of the detection area and the lens information, the detection area display at a predetermined position on the screen.

(13)

The imaging apparatus according to (12) above, in which the image sensor includes a plurality of phase difference detection pixels that perform pupil-division of the image-pickup lens.

(14)

The imaging apparatus according to (12) or (13) above, in which the detection area includes a plurality of detection areas, and the display unit further includes a touch sensor that detects a selection operation for one of a plurality of detection area displays that represent the plurality of detection areas.

(15)

An imaging control method, including:

controlling detection on the basis of a detection area corresponding to a predetermined area in an object image acquired by an image sensor;

correcting, on the basis of lens information relating to an image-pickup lens, the object image displayed on a screen; and displaying, on the basis of the detection area and the lens information, a detection area display at a predetermined position on the screen, the detection area display representing the detection area.

DESCRIPTION OF REFERENCE NUMERALS

100 imaging apparatus, 101, optical imaging system, 101A image-pickup lens, 102 image sensor, 106 control unit, 108 display unit, 108A screen, 150 imaging control apparatus, 151 acquisition unit, 152 detection unit, 153 detection control unit, 154 image correction unit, 155 display control unit

The invention claimed is:

1. An imaging control apparatus, comprising:
   an image-pickup lens;
   an image sensor configured to acquire an object image;
   a display screen; and
   circuitry configured to:
   control detection of a first detection area in the acquired object image;
   control the display screen to display the acquired object image;
   acquire lens information of the image-pickup lens, wherein the acquired lens information includes a focal length and an image-pickup distance;
   correct the displayed object image based on the acquired lens information;
   control the display screen to display the corrected object image and a detection area representation, wherein
   the detection area representation is displayed at a display position on the display screen, the display of the corrected object image and the detection area representation is based on the first detection area and the acquired lens information, and the detection area representation represents the first detection area; and
   correct the display position of the detection area representation based on a change in the display position of the detection area representation, wherein the change in the display position is greater than a determined threshold, and the change in the display position is based on the correction of the displayed object image.

2. The imaging control apparatus according to claim 1, wherein the circuitry is further configured to determine, based on the acquired lens information, the correction of the display position of the detection area representation.

3. The imaging control apparatus according to claim 1, wherein the circuitry is further configured to control the display screen to display the detection area representation based on a focused detection area in the object image.

4. The imaging control apparatus according to claim 1, wherein
   the first detection area includes a plurality of detection areas, and
   the circuitry is further configured to control the detection of the first detection area based on a second detection area selected from the plurality of detection areas.

5. The imaging control apparatus according to claim 4, wherein the circuitry is further configured to determine, based on the acquired lens information, a correction of the selected second detection area.

6. The imaging control apparatus according to claim 1, wherein
   the acquired lens information includes distortion information of the image-pickup lens, and
   the circuitry is further configured to correct distortion of the acquired object image based on the distortion information of the image-pickup lens.

7. The imaging control apparatus according to claim 1, wherein the circuitry is further configured to detect an in-focus position of an area in the acquired object image, and the area corresponds to the first detection area.

8. The imaging control apparatus according to claim 1, wherein the circuitry is further configured to detect an amount of exposure of an area in the acquired object image, and the area corresponds to the first detection area.

9. The imaging control apparatus according to claim 1, further comprising a detection unit configured to detect the first detection area,
   wherein the circuitry is further configured to:
   control the detection unit to detect the first detection area; and
   execute a detection operation based on the first detection area.

10. An imaging apparatus, comprising:
    an image-pickup optical system including an image-pickup lens, wherein the image-pickup optical system is configured to obtain an object image;
    an image sensor configured to acquire the object image obtained by the image-pickup optical system; and
    circuitry configured to:
    control detection of a detection area in the acquired object image;
    control a display screen to display the acquired object image;
    acquire lens information of the image-pickup lens, wherein the acquired lens information includes a focal length and an image-pickup distance;
    correct the displayed object image based on the acquired lens information;
    control the display screen to display the corrected object image and a detection area representation, wherein
    the detection area representation is displayed at a display position on the display screen, the display of the corrected object image and the detection area representation is based on the detection area and the acquired lens information, and the detection area representation represents the detection area; and
    correct the display position of the detection area representation based on a change in the display position of the detection area representation, wherein the change in the display position is greater than a determined threshold, and the change in the display position is based on the correction of the displayed object image.

11. The imaging apparatus according to claim 10, wherein the image sensor includes a plurality of phase difference detection pixels configured to execute pupil-division of the image-pickup lens.

12. The imaging apparatus according to claim 10, wherein the detection area includes a plurality of detection areas, and
    the imaging apparatus further includes a touch sensor configured to detect a selection operation for at least one of a plurality of detection area representations that represent the plurality of detection areas.

13. An imaging control method, comprising:
    controlling detection of a detection area in an object image acquired by an image sensor;
    controlling a display screen to display the acquired object image;
    acquiring lens information of an image-pickup lens, wherein the acquired lens information includes a focal length and an image-pickup distance;
    correcting the displayed object image based on the acquired lens information;
    controlling the display screen to display the corrected object image and a detection area representation, wherein the detection area representation is displayed at a display position on the display screen, the detection area representation represents the detection area, and the display of the corrected object image and the detection area representation is based on the detection area and the acquired lens information; and correcting the display position of the detection area representation based on a change in the display position of the detection area representation, wherein the change in the display position is greater than a determined threshold, and the change in the display position is based on the correction of the displayed object image.

* * * * *